(12) United States Patent
Dhawan et al.

(10) Patent No.: US 12,474,949 B2
(45) Date of Patent: Nov. 18, 2025

(54) SELF-HEALING BOT

(71) Applicant: Bank of America Corporation, Charlotte, NC (US)

(72) Inventors: Lalit Dhawan, Cranbury, NJ (US); Swetha Ravi, Charlotte, NC (US); Pratap Dande, Saint Johns, FL (US)

(73) Assignee: Bank of America Corporation, Charlotte, NC (US)

( * ) Notice: Subject to any disclaimer, the term of this patent is extended or adjusted under 35 U.S.C. 154(b) by 468 days.

(21) Appl. No.: 18/071,843

(22) Filed: Nov. 30, 2022

(65) Prior Publication Data
US 2024/0176650 A1 May 30, 2024

(51) Int. Cl.
*G06F 9/44* (2018.01)
*G06F 9/451* (2018.01)
*G06F 9/48* (2006.01)
*G06N 3/004* (2023.01)

(52) U.S. Cl.
CPC ............ *G06F 9/4806* (2013.01); *G06F 9/453* (2018.02); *G06N 3/004* (2013.01)

(58) Field of Classification Search
CPC .................................................... G06F 9/4806
USPC ......................................................... 718/100
See application file for complete search history.

(56) References Cited

U.S. PATENT DOCUMENTS 11,693,923 B1 * 7/2023 Pallikonda .............. G06F 9/451
706/12

OTHER PUBLICATIONS

Reza M. Parizi et al., "Component-Driven Development in Modern Virtual Assistants: A Mapping Study," https://www.researchgate.net/publication/325016516_Component-Driven_Development_in_Modern_Virtual_Assistants_A_Mapping_Study, Journal Software, vol. 13 No. 2, Feb. 2018.
Cobus Greyling, "General Chatbot Architecture, Design & Development Overview," https://cobusgreyling.medium.com/general-chatbot-architecture-design-development-overview-58e145398608, Jun. 22, 2020.
Mirant Hingrajia, "How Do Chatbots Work? A Guide to Chatbot Architecture," https://marutitech.com/chatbots-work-guide-chatbot-architecture/, Retrieved on Nov. 10, 2022.
Cem Dilmigani, "How to Build a Chatbot: Components and Architecture," https://research.aimultiple.com/chatbot-architecture/, Aug. 25, 2021.
Chanakya Lokam, "Level Set-What is a Chatbot?" https://blog.miraclesoft.com/the-nine-components-that-make-up-a-conversational-chatbot/ Nov. 10, 2022.
"Virtual Assistant," Wikimedia Foundation, Inc., https://en.wikipedia.org/wiki/Virtual_assistant, Oct. 28, 2022.

* cited by examiner

*Primary Examiner* — Timothy A Mudrick
(74) *Attorney, Agent, or Firm* — Weiss & Arons LLP

(57) ABSTRACT

Apparatus and methods are provided for an autonomous bot that learns from user activity. The bot then autonomously acts to complete tasks that the user typically performs. The bot may detect and act in response to detecting a problem with an application. The bot may dynamically generate guidance that assists the user completing a target task. Illustrative guidance may include highlighting differences between software applications, identifying information missing from a document or form and demonstrating how to obtain the needed information or complete a task.

18 Claims, 5 Drawing Sheets

SELF-HEALING BOT

FIELD OF TECHNOLOGY

This application describes apparatus and methods for utilizing artificial intelligence software tools to improve the efficiency and utility of human-computer interactions.

BACKGROUND

Over the last few years there has been a proliferation of automated software tools. Preferably, these automated tools are programmed to autonomously execute repetitive tasks. Delegating repetitive tasks to software tools allows human users to focus on higher order, cognitive and complex tasks.

However, even a higher order, cognitive and complex task typically includes repetitive sub-tasks. However, it is technically challenging to isolate those repetitive sub-tasks from the broader higher order, cognitive and complex task. Additionally, it is technically difficult to determine when an automated tool should autonomously initiate a sub-task, and when execution of the sub-task is itself a decision that should be left to the human user (hereinafter, "user").

As a result of these technical challenges, improvements to automation tools have focused on improving the human-machine interaction. This may include programming automation tools to understand and respond to natural language requests from users, improving intent and entity recognition. Other improvements include filtering background noise, speech-to-text conversion and how speech is generated by the automation tool and disambiguation techniques.

Thus, conventional automation tools are now capable of better understanding user inputs and providing relevant responses to those inputs. For example, an automation tool may receive a query from a user, locate relevant backend systems, conduct an internet search and provide a useful and conversational response to the user inputs. However, conventional automation tools do not identify repetitive sub-tasks or determine when to autonomously act on behalf of a user even absent express user instructions.

As described herein, a SELF-HEALING BOT provides apparatus and methods for identifying a sub-task that can be autonomously serviced by software and determining when to take the autonomous action within a workflow associated with a higher order, cognitive complex task.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
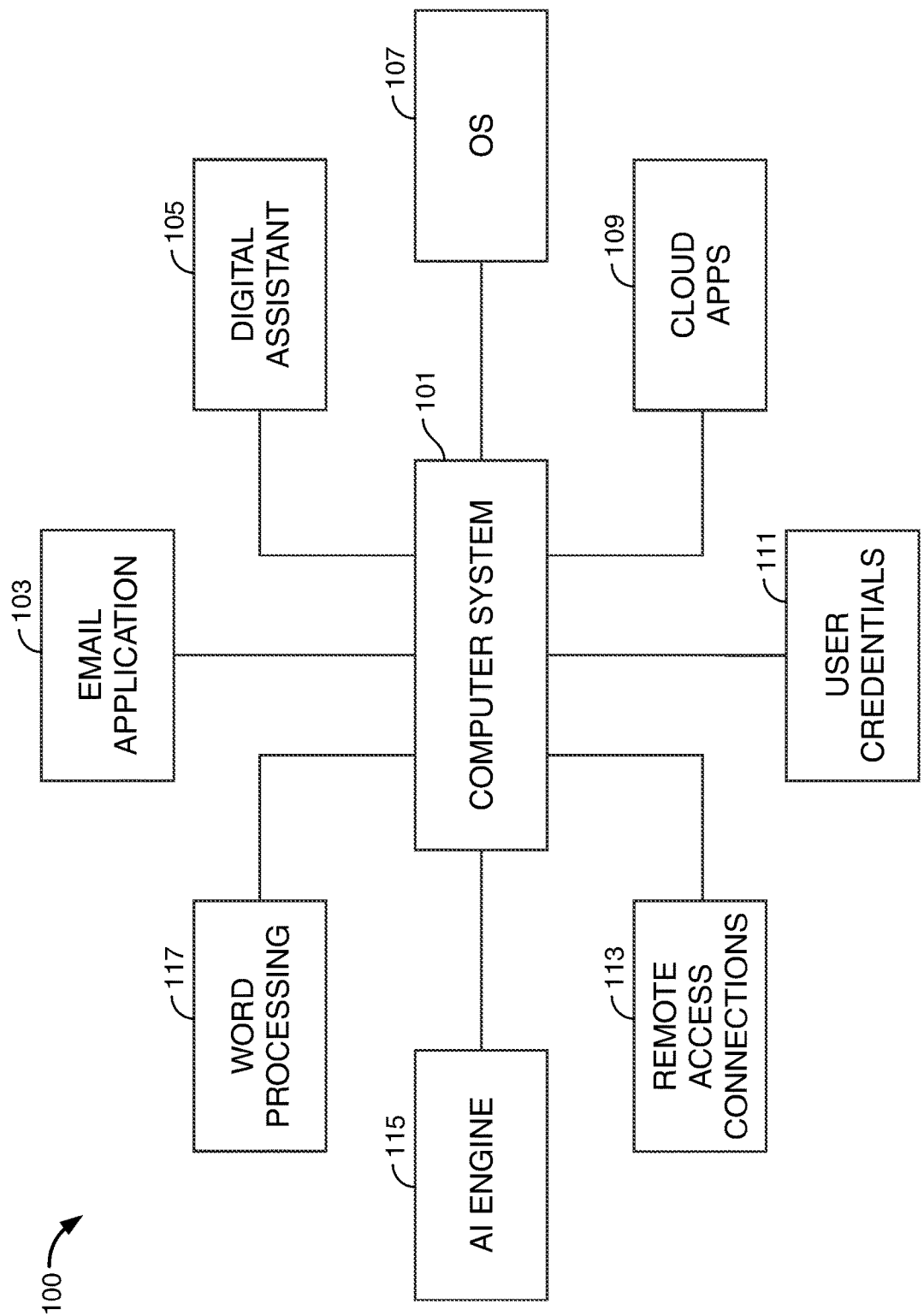
FIG. 1 shows an illustrative system in accordance with principles of the disclosure.

An automated software tool that reduces time spent by users on routine tasks is provided. The tool may detect and monitor user activity. For example, the tool may detect when a user logs into a computer terminal and what tasks the user initiates to accomplish higher order, cognitive and complex tasks. The tool may apply one or more machine learning algorithms to monitor user activity for a threshold amount of time and build a customized library of tasks and associated sub-tasks that are initiated by the user.

The machine learning algorithms may also derive operational rules for executing one or more of the tasks and associated sub-tasks included in the customized library. Based on the derived operational rules, the tool may determine when, within a workflow associated with a higher order, cognitive and complex task the user has reached a sub-task that can be autonomously executed by the software tool.

The software tool may continuously apply machine learning algorithms to user activity and continuously update and change the customized library and associated operational rules. The software tool may build customized libraries and associated operational rules for groups of users.

The software tool may detect when a user requires more time than usual to perform a task. The software tool may autonomously act based on detecting the delay. For example, the tool may autonomously complete one or more sub-tasks on behalf of the user. The tool may identify a sub-task that is preventing completion of a broader task. The tool may identify instructional guidance associated with the sub-task and present that guidance to the user. The instructional guidance may include tutorial videos or a dynamic overlay that shows the user how to complete a sub-task.

The tool may revise a previously executed sub-task. For example, the tool may rerun a previously executed sub-task with different autonomously generated inputs. The tool may obtain the autonomously generated inputs based on extracting data from other sources or changing data previously input by a user. The tool may autonomously generate inputs based on previously entered inputs received from the user in connection with another task. The tool may autonomously generate inputs based on inputs received from the user in connection with another, possibly later in time, sub-task.

Based on the customized library and associated operational rules for sub-tasks, the tool may identify use-patterns associated with a target user. For example, the tool may identify a sequence of tasks that is unique to the target user. Based on the sequence, the tool may autonomously initiate and execute one or more sub-tasks in the sequence. For example, the tool may detect that the user has skipped a sub-task that is typically included in a higher order, complex task. The tool may autonomously take steps to remind the user to execute the skipped sub-task. The tool may autonomously complete the sub-task and present the autonomously completed sub-tasks to the user. The user may have the option to determine whether to include the autonomously completed sub-tasks in the higher order, complex task.

Apparatus and methods for an automated software tool are provided. The automated software tool may include a digital assistant comprising machine executable instructions. The machine executable instructions, when executed by a processor on a computer system may implement one or more functions of the digital assistant.

The computer system may include one or more computer servers. Computer servers, as disclosed herein, may include a processor circuit. The processor circuit may control overall operation of the computer server and its associated components. The processor circuit may include hardware, such as one or more integrated circuits that form a chipset. The hardware may include digital or analog logic circuitry configured to perform any suitable (e.g., logical) operation.

For example, a computer server may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms or any other suitable information or data structures. Components of the server may be linked by a system bus, wirelessly or by other suitable interconnections. System components may be present on one or more circuit boards. In some embodiments, the components may be integrated into a single chip. The chip may be silicon-based.

The server may include RAM, ROM, an input/output ("I/O") module and a non-transitory or non-volatile memory. The I/O module may include a microphone, button and/or touch screen which may accept user-provided input. The I/O module may include one or more speakers for providing audio output and a video display for providing textual, audiovisual and/or graphical output.

A computer server may utilize computer-executable instructions, such as one or more software applications, executed by a processor. Software applications may provide instructions to the processor that enable the server to perform various functions. Exemplary software applications include an operating system, application programs, and an associated database.

Software applications may be stored within the non-transitory memory and/or other storage medium. Some or all of the computer executable instructions of the server may be embodied in hardware or firmware components of the server. Generally, software applications include routines, programs, objects, components, data structures, etc. that perform particular tasks or implement abstract data types.

Software application programs, which may be used by the computer server, may include computer executable instructions for invoking user functionality related to communication, such as email, short message service ("SMS"), and voice input and speech recognition applications. Software application programs may utilize one or more algorithms that formulate predictive machine responses, formulate database queries, process user inputs, process agent inputs, or any other suitable tasks.

The software applications may include an artificial intelligence ("AI") engine. The AI engine may perform machine learning AI and deep learning AI. Machine learning AI may identify patterns in data sets and make decisions based on the detected patterns. Machine learning AI is typically used to predict future behavior. Machine learning AI improves each time the AI system receives new data because new patterns may be discovered in the larger data set now available to the machine learning AI. Deep learning AI adapts when exposed to different patterns of data. Deep learning AI may uncover features or patterns in data that the deep learning AI was never specifically programmed to find.

The AI engine may utilize one or more machine learning algorithms. The machine learning algorithms may identify patterns of tasks and sub-tasks in user activity and make decisions about how and when to autonomously execute a task or sub-task on behalf of a user. Machine learning algorithms improve over time because the algorithms are programmed to learn from previous decisions. Illustrative machine learning algorithms may include AdaBoost, Naive Bayes, Support Vector Machine and Random Forests. An illustrative machine learning algorithm may include a neural network such as Artificial Neural Networks and Convolutional Neural Networks.

Generally, a neural network implements machine learning by passing an input through a network of neurons—called layers—and providing an output. The more layers of neurons that are included in the neural network, the "deeper" the neural network. A neural network learns from outputs flagged as erroneous and adapts its neuron connections such that the next time the neural network receives a particular input it generates a more relevant output.

To effectively provide relevant outputs, a neural network must first be trained by analyzing training data sets. An illustrative data set may include user activity. Neural networks learn from the training data sets and rearrange interconnection between layers of the network in response to processing the training data. The strength or weight of a connection between layers of the neural network can vary. A connection between two or more layers can be strong, weak or anywhere in between. A neural network may self-adapt by adjusting the strength of the connections among its layers to generate more accurate outputs.

A computer server may include a communication circuit. The communication circuit may include a network interface card or adapter. When used in a WAN networking environment, the computer server may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the computer server may be operated in a client-server configuration to permit retrieval of web pages from a web-based server. Web browsers can be used to display and manipulate data on web pages.

The computer server may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

The computer server may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones, multiprocessor systems, minicomputer systems, microprocessor systems, mainframe computers, distributed computing environments that include any of the above systems or devices, and the like.

The computer server may be operational with distributed computing environments where tasks are performed by remote processing devices that are linked through a communications network. In a distributed computing environment, program modules may be located in both local and remote computer storage media including memory storage devices. The computer server may rely on a network of remote servers hosted on the Internet to store, manage, and process data (e.g., "cloud computing" and/or "fog computing").

The computer server may be operational with other computer servers produced by different manufacturers. For example, a user may connect to a server hosting an automated chatbot system via a first computer server, and the chatbot that processes the user's inputs may be run on a second computer server. An agent may utilize a third computer server to submit inputs while interacting with the user and/or the chatbot.

The computer server may include cloud computing and virtualization implementations of software. Such implementations may be designed to run on a physical server supplied externally by a hosting provider, a client, or other virtualized platform.

The computer server may capture data in different formats. The computer server may use different data structures to store captured data. The computer server may utilize different communication protocols to transmit captured data or communicate with other systems. Despite such operational differences, two or more computer servers may be configured to operate substantially seamlessly with different servers, operating systems, hardware or networks.

During a learning phase, the AI engine may track execution of one or more user tasks implemented using a computer system. The computer system may include a computer server, cloud-based system or any other software or hardware tools. The AI engine may identify user patterns for executing one or more of the tasks and associated sub-tasks. The machine learning algorithms may also derive operational rules for executing the one or more tasks and associated sub-tasks. Based on the operational rules, the tool may determine when, within a higher order, complex task, the user has reached a sub-task that can be autonomously executed by the software tool For example, the tool may identify a sequence of tasks that is unique to the target user. Based on the sequence, the tool may autonomously initiate and may execute one or more sub-tasks in the sequence. For example, the tool may detect that the user has skipped a sub-task that is typically included in a higher order, complex task. The tool may take steps to remind the user to execute the skipped sub-task. The tool may autonomously complete the sub-task and present the completed sub-tasks to the user. The user may then determine whether to add the completed sub-tasks to the higher order, complex task.

The AI engine may formulate an operational schedule for implementing one or more user tasks. During an execution phase, based on the operational schedule, the AI engine may autonomously initiate and implement one or more sub-task associated with the user tasks. For example, the AI engine may detect that a user has initiated a task included on the operational schedule. The AI engine may monitor user progress in completing the task. Based on the operational schedule, the AI engine may determine an expected completion time for the task.

If the user has not completed the task by the completion time, the AI engine may determine which sub-tasks still need to be completed. The AI engine may examine sub-tasks that have already been completed by the user. The AI engine may determine that the user needs information or access to a target system to complete the task. The AI engine may autonomously locate the needed information. The AI engine may autonomously request access, on behalf of the user, to the target system.

In some embodiments, the AI engine may present the located information or access request to the user. The user may then have the option of accepting the presented information or access to complete the task. In some embodiments, the AI engine may autonomously use the information or access to complete the task or sub-task. In such embodiments, after autonomously completing the sub-task, the AI engine may prompt the user to begin another sub-task needed to complete the task.

The AI engine may detect that the user has partially completed a target user task. The AI engine may determine at least one sub-task needed to complete the user task. The AI engine may provide the user with guidance on how to complete the at least one sub-task. Illustrative guidance may include highlighting or otherwise making the user aware of a field that needs to be completed or that has incomplete or incorrectly formatted input.

The AI engine may detect that the user has completed a target sub-task. The AI engine may compare the target sub-task to a model sub-task formulated for the user. The model sub-task may be formulated during the learning phase by one or more machine learning algorithms. The model sub-task may include formatting and annotations showing the user how to complete the target sub-task. The model sub-task may include user-specific details custom generated for a target user, based on activity of the target user detected during the learning phase.

The AI engine may detect at least one difference between the target sub-task and the model sub-task. In response to detecting the at least one difference, the AI engine may present the model sub-task to the target user and the at least one difference. The presentation of the difference to the target user may provide guidance on how to complete the target sub-task.

The AI engine may generate the guidance in real-time. The AI engine may generate the guidance based on how the user has historically completed the at least one sub-task (e.g., during the learning phase). The AI engine may dynamically compute different guidance for different users and different tasks. The AI engine may dynamically compute different guidance for different software applications or hardware systems.

The AI engine may compute guidance based on activity of a plurality of users. During a learning phase the AI engine may monitor one or more user tasks implemented using one or more computer systems for the plurality of users. Based on the ongoing monitoring, the machine learning algorithms may identify patterns which determine guidance modes or methods have been most effective for the plurality of users. The AI engine may determine whether the plurality of users share a common characteristic. Illustrative common characteristics may include guidance that has been most effective for a given hardware or software system, a target location, in a target language, using a target medium (e.g., video, audio, text) or organizational team.

The AI engine may dynamically compute different guidance based on historical activity of the user. For example, even after transitioning to an execution phase, the AI engine may continue to track execution of one or more user tasks implemented using the computer system. Based on the ongoing tracking, the machine learning algorithms may identify patterns which determine guidance modes or methods have been most effective for a target user or target group of users. When needed, the AI engine may generate guidance that is most effective for the user.

The AI engine may dynamically compute different guidance based on ongoing user activity. For example, if the AI engine detects that the user is currently servicing a heavy workload, the AI engine may autonomously locate needed information, integrate the needed information into a sub-task and present an adjusted sub-task to the user for confirmation. On the other hand, if the user is servicing a relatively light workload, the AI engine may utilize the opportunity to educate the user how to complete the sub-task correctly and efficiently.

In response to detecting the at least one difference between the target sub-task and the model sub-task, the AI engine may abort the current action. The AI engine may determine that the target user does not have credentials or access to information needed to complete the target sub-task. The AI engine may determine that another user may have credentials, access to information or the capability to complete the target sub-task within a threshold time window. The AI engine may transfer the sub-task to the other user. The AI engine may autonomously request credentials or access to needed information on behalf of the target user.

The AI engine may compute at least one adjustment to the target sub-task. The adjustment may represent a potential change to input data associated with the target sub-task. The AI engine may determine that adopting the adjustment may allow the user to successfully complete the target sub-task. The AI engine may present the at least one adjustment along with the difference to the user. The AI engine may autonomously implement the at least one adjustment a threshold time after presenting the at least one adjustment to the user.

A digital assistant is provided. The digital assistant may include machine executable instructions, that when executed by a processor on a computer system implement various functions. Illustrative functions may include, during a learning phase, tracking execution of one or more user tasks implemented using the computer system. The digital assistant may include an AI engine that executes one or more machine learning algorithms.

The machine learning models may identify patterns in data sets and make decisions based on the detected patterns. Illustrative patterns may include time needed to complete a task or sub-task. Illustrative patterns may include identifying times during the day when the user is likely busy with other tasks. The illustrative patterns may include informational items and formatting of those items for successfully completing a task or sub-task. The illustrative patterns may include hardware and software tools needed to complete a task or sub-task.

The AI engine may collate operational processes for autonomously implementing the one or more user tasks or sub-tasks on the computer system. During an execution phase, the AI engine may track time spent by a user on a target task. At a target time, the AI engine may identify a first sub-task of the target task that, based on the operational schedule, should have been completed by the target time. Based on the collated operational processes, the AI engine may autonomously complete the first sub-task.

The AI engine may initiate a second sub-task of the target task. The second sub-task may be the next step in a sequential workflow associated with the target task. The AI engine may identify the second sub-task based on information gathered and patterns computed during the learning phase. The target time may be a first target time. At a second target time, the AI engine may determine that, based on the operational schedule, the second sub-task should have been completed by the second target time. The AI engine may initiate a dialogue with the user regarding completion of the second sub-task.

The dialogue with the user regarding completion of the second sub-task may include presenting, to the user, interactive instructions on how to complete the second target sub-task. The AI engine may dynamically generate the interactive instructions in real time. For example, the AI engine may generate the interactive instructions based on an operating system of the computer system, a language of the computer system or one or more patterns of operational processes associated with the user in question.

The AI engine may formulate an operational schedule for implementing the one or more user tasks. The AI engine may compute the target time based on the operational schedule. Based on the operational schedule, The AI engine may adjust an operational tempo of autonomously completing the first sub-task and/or the second sub-task. The operational tempo may correspond to how much time a target user needs to complete one task or sub-task and move to the next task or sub-task. Each user may have a different operational tempo. Different operational processes may have different operational tempos.

Based on tracking execution of one or more user tasks implemented using the computer system, the AI engine may determine a target operational tempo. The determined target operational tempo may be adjusted based on ongoing user activity tracked during the learning and execution phases. The AI engine may adjust presentation of guidance based on the target operation tempo. For example, the AI engine may throttle autonomous completion of sub-tasks based on the operational tempo. Based on the operational tempo, the AI engine may determine whether to autonomously adjust input to a sub-task or flag an error to the user and request that the user fix the error.

The target time may be a first target time. Based on monitoring operation of at least one other of the one or more user tasks, the AI engine may determine a second target time for triggering autonomous completion of the second sub-task. The second target time may be based on the target operational tempo computed for a target user, target application or target hardware/software system.

The AI engine may integrate with other software applications. For example, the AI engine may integrate with a user's email application and track inbox and receive/send activity. The AI engine may adjust autonomous scheduling of tasks based on calendared events, content, inflow or outflow of email messages.

The AI engine may allow suspend calculation of time spent by a user on a target task based on monitoring activity of other applications. For example, the AI engine may allow a user to attend an urgent email message before prompting the user to attend to another lower-priority task. Time the user spends addressing the urgent email may not be included when computing a threshold time window for autonomously triggering completion of an unfinished target sub-task or presenting guidance to the user.

An artificial intelligence ("AI") method for autonomously configuring a computer server is provided. The AI method may include tracking execution of one or more tasks implemented by a first user on a first computer server. The AI method may include collating a set of operational processes associated with the one or more user tasks implemented by the first user. The collating may include computing when a user is engaged in certain tasks or workflows and an amount of time the user spends engaged in those tasks or workflows.

The collating may include determining applications and hardware needed to accomplish those tasks or workflows.

The AI method may include detecting a first login of a second user to a second computer server. Based on the collating, the AI method may determine that the second user is part of the same group, organizational team or division as the first user. The AI method may determine that the second user has been engaged in the same tasks and workflows as the first user. In response to detecting the login of the second user, the AI engine may autonomously trigger installation of the set of applications on the second computer server. The installation of the second set of applications may allow the second user to engage and accomplish the tasks and workflows assigned to the users in the group, organizational team or division of the second user.

The AI methods may include configuring the set of applications for use on the second computer server. Configuring the applications may include setting access controls or security protocols that allow the second user to interact with other members of the group, organizational team or division. The AI method may include autonomously triggering execution of one or more members included in the set of applications. For example, in response to a second login of the second user to the second computer server, the AI methods may include autonomously connecting the second computer server to a cloud-based system or initiating a application regularly used by the group, organizational team or division of the second user.

The AI methods may include tracking execution of one or more tasks implemented by the second user on the second computer server. Based on activity of the second user, the AI methods may include adjusting an operational tempo associated with the autonomous triggering. The operational tempo may be customized based on activity of the second user. In some embodiments, the operational tempo may be customized based on activity, goals or mission of the group, organizational team or division of the second user.

The AI method may include tracking execution of one or more tasks implemented by the second user on the second computer server. Based on the activity of the second user, the AI method may include removing an application from the set of applications autonomously installed the second computer server. The AI engine may determine that based on the activity of the second user, a target application is not needed by the second user. The AI engine may determine that leaving the unused application on the second computer server may pose a security threat to the second computer server or greater information technology infrastructure. For example, an unused application may not be updated or patched and may therefore be vulnerable to malicious actors.

The AI method may include tracking execution of one or more tasks implemented by the second user on the second computer server. The AI method may include detecting a manual initiating of the one or more tasks by the first user or the second user. The AI method may include computing a customized set of remaining sub-tasks needed to complete the one or more manually initiated tasks for the first user or the second user.

An AI engine may compute the remaining sub-tasks based on tracking execution of one or more tasks implemented by the first or second user. The AI engine may collate operational processes for autonomously implementing the tracked tasks. The AI method may include autonomously triggering execution of the customized set of remaining sub-tasks for the first or second user.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system 100. System 100 includes computer system 101. Computer system 101 may be a computer server that provides computational tools for users to accomplish tasks that collectively form a higher order, cognitive and complex task. System 100 includes word processing application 117, email application 103 and operating system 107. System 100 may provide access to cloud applications 109 via remote access connections 113 and user credentials 111.

System 100 also includes AI engine 115 and digital assistant 105. Based on intelligence formulated by AI engine 115, digital assistant 105 may autonomously assist users of system 100. Based on intelligence formulated by AI engine 115, digital assistant 105 may autonomously assist users of system 100 implement functionality provided by other applications running on computer system 101 (e.g., 117, 103, 107, 109).

AI engine 115 may track execution of one or more user tasks implemented using computer system 101. AI engine 115 may apply one or more machine learning algorithms to the tracked execution. AI engine 115 may formulate an operational schedule for implementing the one or more user tasks performed on computer system 101.

During an execution phase, AI engine 115 may autonomously initiate or implement tasks applying functionality of applications running on computer system 101. AI engine 115 may autonomously initiate or implement such tasks based on the operational schedule formulated during the learning phase. AI engine 115 may autonomously initiate or implement such tasks based on the operational schedule and current user activity of computer system 101.

During an execution phase, based on the operational schedule, digital assistant 105 may provide a user interface for presenting autonomously generated guidance on how to use functionality of applications running on computer system 101 (e.g., 117, 103, 107, 109). Digital assistant 105 may provide a user interface for communicating with a user regarding status of autonomously initiated or implemented tasks.

For example, based on a time of year (e.g., holiday season) AI engine 115 may present guidance to a user on how to set an out-of-office reply for email application 103. AI engine 115 may generate guidance on how to format the out-of-office reply using word processing application 117 and then apply the formatted reply within email application 103. Based on the out-of-office reply, AI engine 115 may configure cloud-based applications 109 to reject login requests from computer system 101. The guidance may be presented within the user interface provided by digital assistant 105.

Figure 2:
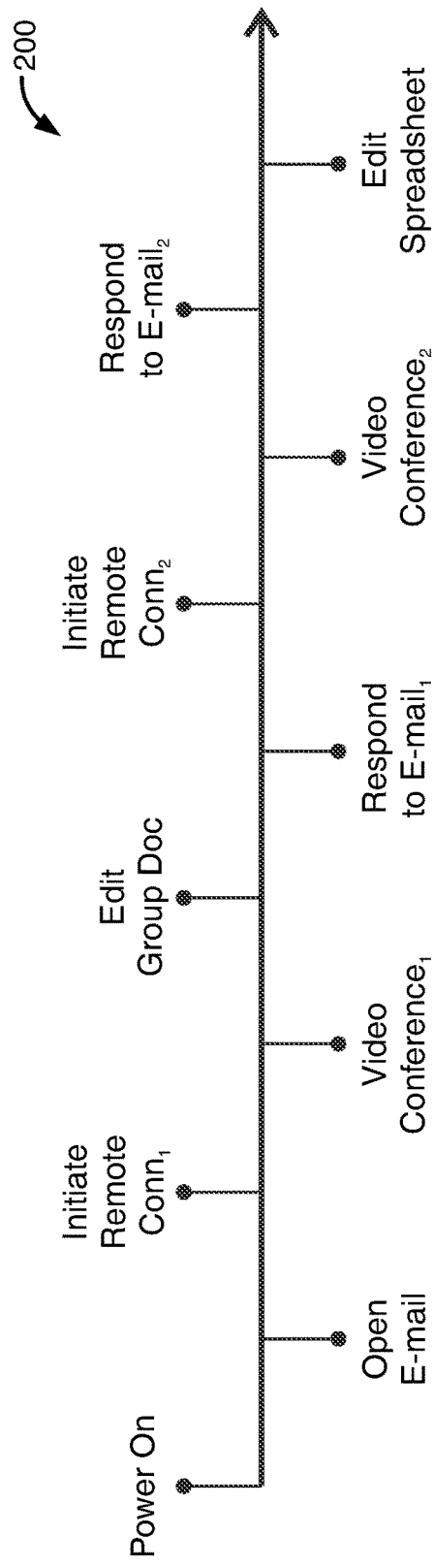
FIG. 2 shows an illustrative segment of a learning phase in accordance with principles of the disclosure.

FIG. 2 shows illustrative timeline 200. Timeline 200 represents an illustrative operational schedule formulated by AI engine 115. Timeline 200 may be presented to a user by digital assistant 105. Each task included on timeline 200 may comprise a plurality of sub-tasks. AI engine 115 may track execution of the tasks included on timeline 200. AI engine 115 may use an earlier in time execution to trigger a later in time execution. For example, detecting a response to an email may trigger initiation of a remote connection or video conference.

Figure 3:
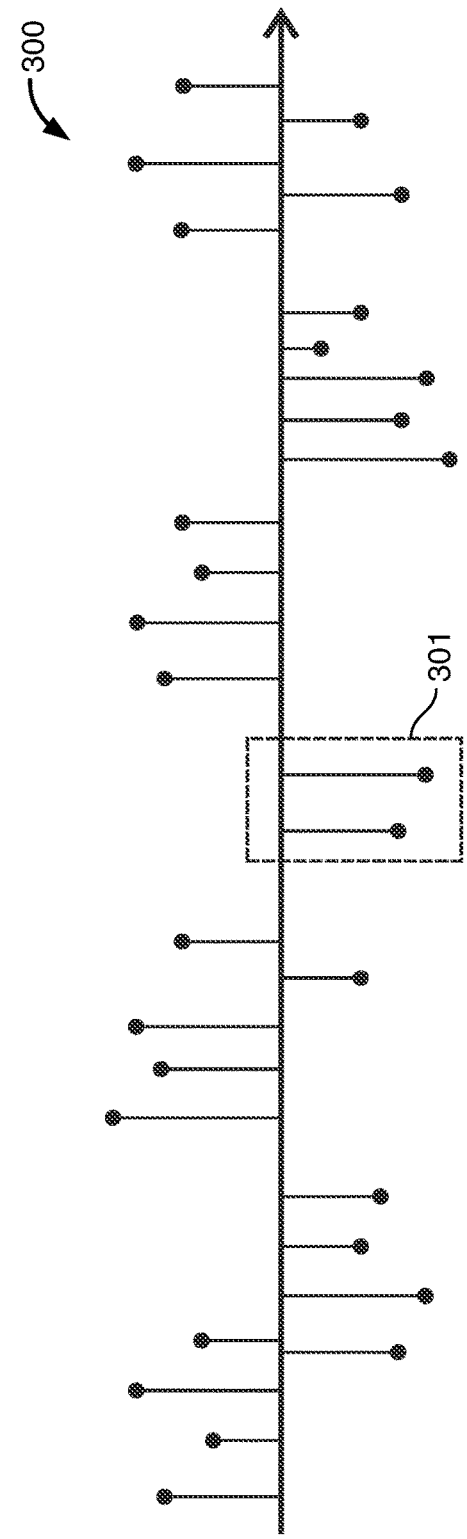
FIG. 3 shows an illustrative segment of an execution phase in accordance with principles of the disclosure.

FIG. 3 shows illustrative timeline 300. Timeline 300 represents an illustrative operational schedule formulated by AI engine 115 for autonomous completion of sub-tasks. Based on timeline 200, AI engine 115 may compute an estimated completion time for a target task. AI engine 115 may detect that a user has initiated the target task. AI engine 115 may detect that the user has partially completed the target task. For example, the user may have completed one or more sub-tasks 301 of a target task. Completion of the target task may require execution of additional sub-tasks. AI engine 115 may determine the at least one sub-task needed to complete the target user task. AI engine 115 may autonomously execute or prompt a user to execute the remaining sub-tasks.

Figure 4:
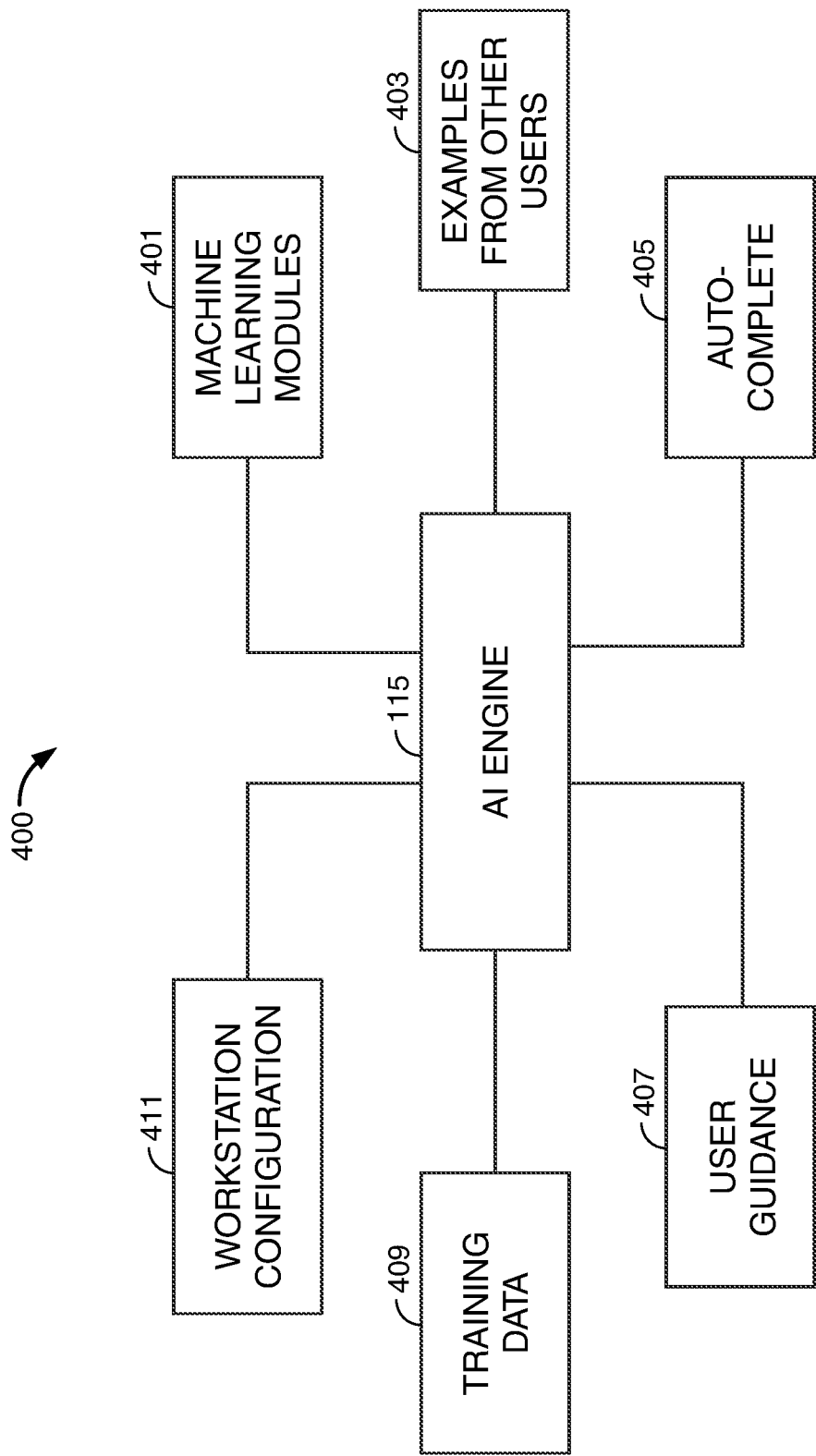
FIG. 4 shows an illustrative system in accordance with principles of the disclosure.

FIG. 4 shows illustrative system 400. System 400 shows illustrative components of AI engine 115. AI engine 115 may include computer-executable instructions, such as program modules, executable by a processor on computer system 101. Illustrative program modules may include routines, programs, objects, components, and data structures that perform particular tasks or implement abstract data types.

AI engine 115 includes machine learning modules 401. Machine learning modules 401 may gather training data 409. AI engine 115 may use training data 409 to train one or more machine learning algorithms to detect patterns in execution of user tasks on computer system 101. Based on the detected patterns, AI engine 115 may formulate operational rules to autonomously assist users complete tasks.

Exemplary rules may indicate when AI engine 115 should offer a user guidance 407 on how to complete a task. Exemplary rules may indicate when AI engine 115 should autonomously trigger auto-complete module 405. Exemplary rules may indicate how and when AI engine 115 should autonomously trigger computer server configuration module 411.

Machine learning modules 401 may improve over time because the associated machine learning algorithms are programmed to learn from previous decisions and actions of AI engine 115. Illustrative machine learning algorithms may include AdaBoost, Naive Bayes, Support Vector Machine, Random Forests and neural networks such as Artificial Neural Networks and Convolutional Neural Networks.

AI engine 115 may gather training data 409 via other user activity module 403. For example, AI engine 115 may track activity (e.g., task initiations and completions) of other users. AI engine 115 may compute activity patterns for a group of users. The group of users may share a common characteristic, membership in an organizational team or division of the second user. Based on the computed activity patterns, AI engine 115 may derive timing intelligence of when to autonomously prompt a user to complete a task or autonomously complete a task.

Autonomous completion of a task may be formulated by auto-complete module 405. Auto-complete module 405 may determine, based on activity patterns, what information is missing to complete a task. Auto-complete module 405 may determine customized information that is missing based on user activity, or user interaction with a target software application. For example, for different users or applications, auto-complete module 405 may determine different information for an otherwise identical task.

Based on the activity patterns, AI engine 115 may activate guidance module 407 for a target user. Guidance module 407 may include content that is customized for the target user, based on the user's tracked activity. For example, AI engine 115 may determine an ideal time to trigger guidance module 407. AI engine 115 may determine when the target user will be "between tasks" and able to view and act on guidance presented by guidance module 407.

Based on the activity patterns, AI engine 115 may trigger computer server configuration module 411. Computer server configuration module 411 may autonomously configure a computer server with hardware settings and software applications. For example, if a new user joins a group, computer server configuration module 411 may recognize that the new user is a member of the group and configure the new user's computer server with the necessary hardware and software tools to perform tasks and other functions of the group.

Figure 5:
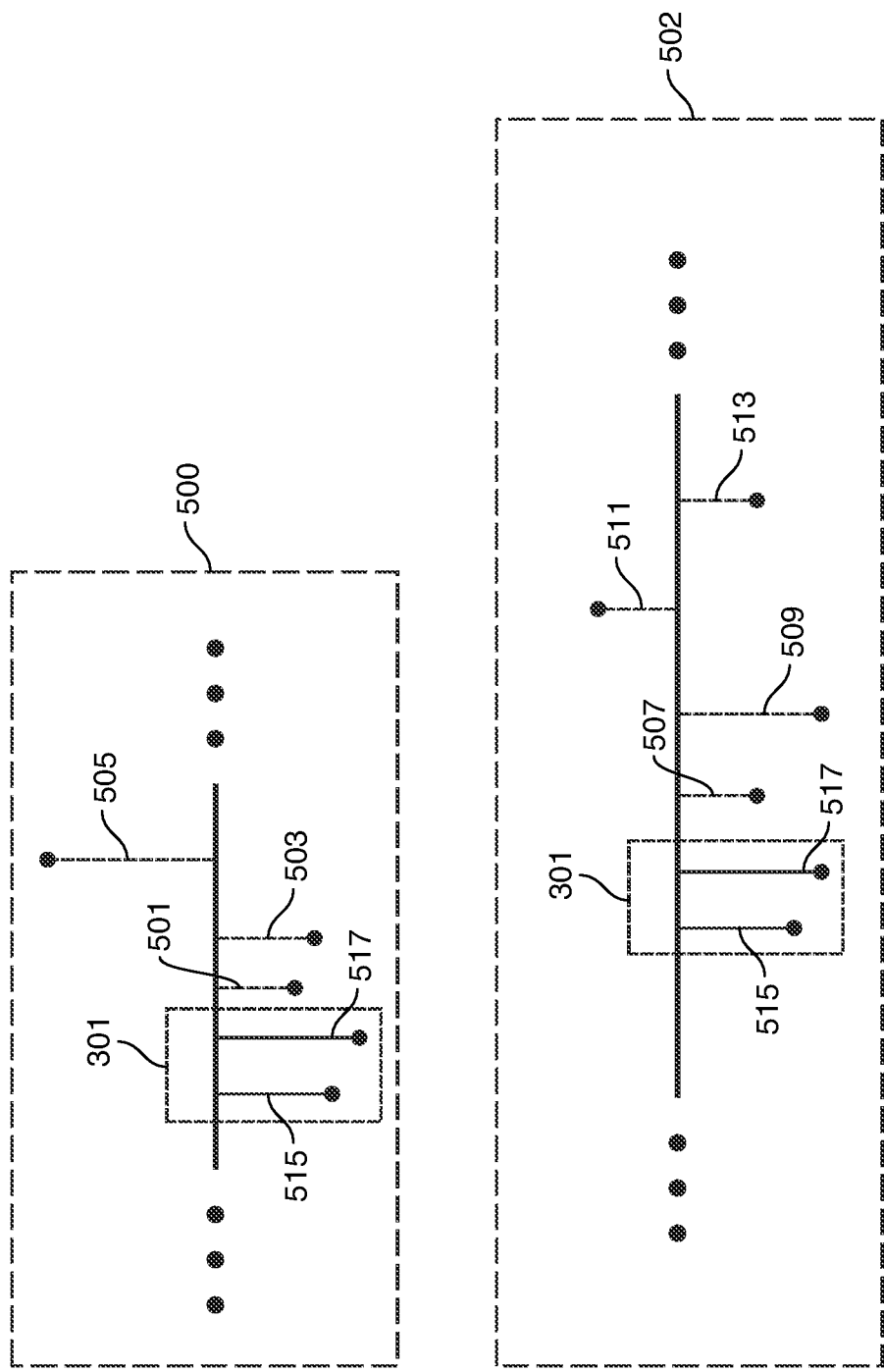
FIG. 5 shows illustrative sub-tasks that have been autonomously identified and completed in accordance with principles of the disclosure.

FIG. 5 shows examples of AI engine 115 autonomously completing sub-tasks 301 (shown in FIG. 3) for $user_1$. AI engine 115 may track activity $user_1$ and determine that $user_1$ has initiated sub-task 515 and sub-task 517. AI engine 115 may determine that initiation of sub-tasks 515 and 517 indicate that $user_1$ has begun task 500. AI engine 115 may determine that after passage of a target amount of time, $user_1$ should have move on to subsequent sub-tasks needed to complete the task 500. FIG. 5 shows that for $user_1$, AI engine 115 has autonomously triggered execution of sub-tasks 501, 503 and 505 to complete task 500.

FIG. 5 also shows that AI engine 115 autonomously completing task 502 for $user_2$. FIG. 5 shows that AI engine 115 may complete although the same sub-task 515 and sub-task 517 have been initiated by $user_2$, AI engine 115 autonomously completes tasks 500 and 502 differently for user, and $user_2$. AI engine 115 may track activity of $user_2$ and determine that $user_2$ has initiated sub-tasks 515 and 517. AI engine 115 may determine that initiation of sub-tasks 515 and 517 indicate that $user_2$ has begun task 502. AI engine 115 may determine, that after passage of a target amount of time, $user_2$ should have move on to subsequent sub-tasks needed to complete task 502.

FIG. 5 shows that for $user_2$, AI engine 115 has autonomously triggered execution of sub-tasks 507, 509, 511 and 513 to complete task 502 on behalf of $user_2$. FIG. 5 shows that AI engine 115 may operate differently for $user_1$ or $user_2$. FIG. 5 shows that for $user_1$, AI engine 115 has autonomously completed task 500 using fewer sub-tasks with less time between each sub-task relative to the number of sub-tasks and time between sub-tasks autonomously triggered to complete task 502 on behalf of $user_2$.

Figure 6:
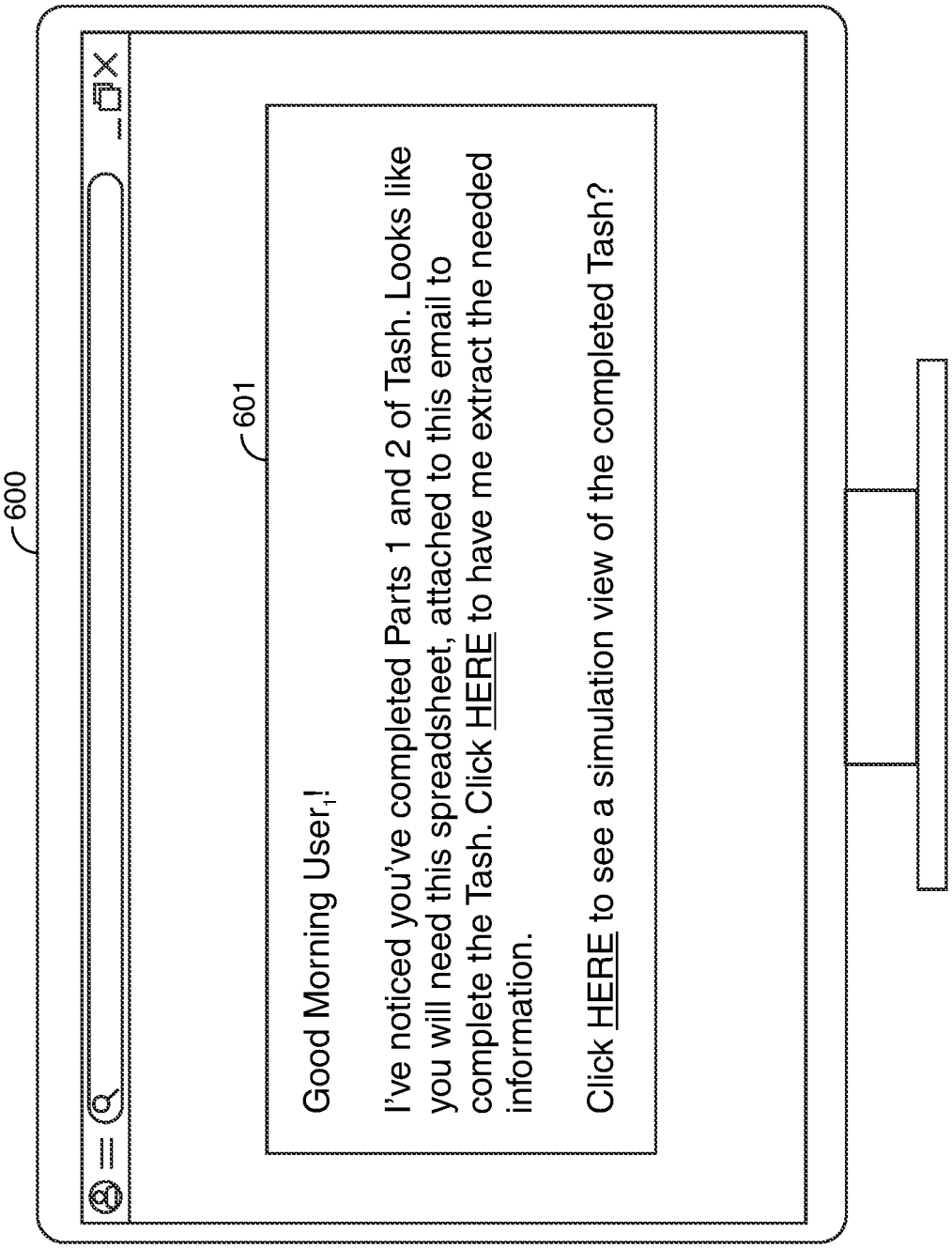
FIG. 6 shows an illustrative user interface in accordance with principles of the disclosure.

FIG. 6 shows illustrative user interface 600 for presenting exemplary user guidance 601. User guidance 601 may be customized for a target user. AI engine 115 may trigger user interface 600 to present guidance 601. AI engine 601 may dynamically compute different guidance to be presented by user interface 600 based on ongoing or historical user activity. User guidance module 407 may utilize user interface 600 to present guidance to a target user.

Thus, methods and apparatus for a SELF-HEALING BOT are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An artificial intelligence ("AI") method for autonomously configuring a computer server, the AI method comprising:
    tracking execution of one or more tasks implemented by a first user on a first computer server;
    collating a set of operational processes associated with the one or more tasks implemented by the first user;
    detecting a first login of a second user to a second computer server; and
    based on the collating:
    installing the set of applications on the second computer server;
    configuring the set of applications for use on the second computer server; autonomously triggering execution of the set of applications in response to a second login of the second user to the second computer server;
    tracking execution of one or more tasks implemented by the second user on the second computer server;
    detecting a manual initiating of the one or more tasks by the first user or the second user;
    computing a customized set of remaining sub-tasks needed to complete the one or more tasks for the first user or the second user; and
    autonomously triggering execution of the customized set of remaining sub-tasks.

2. The AI method of claim 1, further comprising:
    tracking execution of one or more tasks implemented by the second user on the second computer server; and
    based on activity of the second user, adjust a tempo associated with the autonomously triggering.

3. The AI method of claim 1, further comprising:
    tracking execution of one or more tasks implemented by the second user on the second computer server; and
    based on activity of the second user, removing a member of the set of applications from the second computer server.

4. A digital assistant comprising machine executable instructions, that when executed by a processor on a computer system:
    during a learning phase:
    track execution of one or more user tasks implemented using the computer system;
    formulate an operational schedule for implementing the one or more user tasks;
    during an execution phase, based on the operational schedule, autonomously initiate and implement one or more of the user tasks;
    detect manual completion of a target sub-task;
    for a first user, autonomously initiate and implement a first set of sub-tasks in addition to the target sub-task to complete a first task; and
    for a second user, autonomously initiate and implement a second set of sub-tasks in addition to the target sub-task to complete a second task.

5. The digital assistant of claim 4, the machine executable instructions, when executed by the processor on the computer system:
    detect that a user has manually initiated a target user task;
    compute, based on the operational schedule, an estimated completion time for the target user task; and
    autonomously execute at least one sub-task of the target user task after the estimated completion time.

6. The digital assistant of claim 4, the machine executable instructions, when executed by the processor on the computer system:
    detect that a user has partially completed a target task;
    determine at least one sub-task needed to complete the target task; and
    providing the user with guidance on how to complete the at least one sub-task.

7. The digital assistant of claim 4 the machine executable instructions, when executed by the processor on the computer system:
    detect that a user has completed a target sub-task;
    compare the target sub-task to a model sub-task formulated for the user;
    detect at least one difference between the target sub-task and the model sub-task; and
    in response to detecting the at least one difference, present to the user:
    the model sub-task; and
    the at least one difference.

8. The digital assistant of claim 7 the machine executable instructions, when executed by the processor on the computer system, in response to detecting the at least one difference:
    compute at least one adjustment to the target sub-task; and
    present the at least one adjustment along with the difference.

9. The digital assistant of claim 8 the machine executable instructions, when executed by the processor on the computer system autonomously implement the at least one adjustment a threshold time after presenting the at least one adjustment to the user.

10. The digital assistant of claim 6, the machine executable instructions, when executed by the processor on the computer system compute the guidance in real-time based on how the user has historically completed the at least one sub-task.

11. The digital assistant of claim 8 the machine executable instructions, when executed by the processor on the computer system compute the at least one adjustment based on historical activity of the user.

12. The digital assistant of claim 6, the machine executable instructions, when executed by the processor on the computer system compute the guidance based on activity of a plurality of users.

13. A digital assistant comprising machine executable instructions, that when executed by a processor on a computer system:
    during a learning phase:
    track execution of one or more user tasks implemented using the computer system;
    collate operational processes for autonomously implementing the one or more user tasks on the computer system;
    formulate an operational schedule for implementing the one or more user tasks; and
    during an execution phase:
    track time spent by a user on a target task;
    at a target time, identify a first sub-task of the target task that, based on the operational schedule, should have been completed by the target time;
    based on the collated operational processes, autonomously complete the first sub-task; and initiate a second sub-task of the target task;
upon completion of the target sub-task;
for the first user, autonomously initiate and implement a first set of sub-tasks in addition to the target sub-task to complete a first task; and
for a second user, autonomously initiate and implement a second set of sub-tasks in addition to the target sub-task to complete a second task.

14. The digital assistant of claim 13, the machine executable instructions, when executed by the processor on the computer system, wherein the target time is a first target time:
at a second target time, determine that, based on the operational schedule, the second sub-task should have been completed by the second target time; and
initiate a dialogue with the user regarding completion of the second sub-task.

15. The digital assistant of claim 14, wherein the dialogue with the user regarding completion of the second sub-task comprises presenting to the user interactive instructions on how to complete the second target sub-task.

16. The digital assistant of claim 13, the machine executable instructions, when executed by the processor on the computer system:
formulate an operational schedule for implementing the one or more user tasks; and
compute the target time based on the operational schedule.

17. The digital assistant of claim 13, the machine executable instructions, when executed by the processor on the computer system, adjusts an operational tempo to autonomously complete the first sub-task and the second sub-task based on the operational schedule.

18. The digital assistant of claim 16, wherein the target time is a first target time, and the machine executable instructions, when executed by the processor on the computer system determine, based on monitoring operation of at least one other of the one or more user tasks, a second target time for triggering autonomous completion of the second sub-task.

* * * * *